(12) United States Patent
Yang et al.

(10) Patent No.: US 8,072,202 B2
(45) Date of Patent: *Dec. 6, 2011

(54) GATE DRIVER IN BUCK CONVERTERS

(75) Inventors: Bo Yang, San Diego, CA (US); Jason Zhang, Monterey Park, CA (US); Michael A. Briere, Woonsocket, RI (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/925,199

(22) Filed: Oct. 15, 2010

(65) Prior Publication Data

US 2011/0074375 A1    Mar. 31, 2011

Related U.S. Application Data

(63) Continuation of application No. 12/163,100, filed on Jun. 27, 2008, now Pat. No. 7,839,131.

(60) Provisional application No. 60/946,550, filed on Jun. 27, 2007.

(51) Int. Cl.
*G05F 1/40* (2006.01)
(52) U.S. Cl. .................................................... 323/282
(58) Field of Classification Search ................... 323/222, 323/282–288, 351
See application file for complete search history.

(56) References Cited

U.S. PATENT DOCUMENTS

| | | | | |
|---|---|---|---|---|
| 4,609,861 A | * | 9/1986 | Inaniwa et al. | 320/152 |
| 5,663,672 A | * | 9/1997 | Nuechterlein | 327/374 |
| 6,686,729 B1 | * | 2/2004 | Kawamura et al. | 323/282 |
| 7,176,662 B2 | * | 2/2007 | Chandrasekaran | 323/222 |
| 7,777,460 B2 | * | 8/2010 | Schuellein | 323/272 |
| 7,839,131 B2 | * | 11/2010 | Yang et al. | 323/282 |
| 2007/0247129 A1 | * | 10/2007 | Jacobs | 323/282 |
| 2008/0290911 A1 | * | 11/2008 | Williams | 327/109 |
| 2010/0171475 A1 | * | 7/2010 | Leman et al. | 323/282 |

* cited by examiner

*Primary Examiner* — Adolf Berhane
(74) *Attorney, Agent, or Firm* — Farjami & Farjami LLP

(57) ABSTRACT

A circuit comprising a gate driver including first and second switching stages for driving respective sync and control switches, at least one of which is a normally ON depletion mode device, and another circuit connected to the first and second switching stages and including first and second circuits. The first circuit is coupled to the first switching stage and to the sync switch, the first switching stage having a first state wherein the sync switch is on, and a second state wherein a first bias voltage is switched to the gate of the sync switch to turn it off. The second circuit has a first state wherein the control switch is on when the sync switch is off, and a second state wherein the control switch is switched off when the sync switch is on by switching a second bias voltage to the gate of the control switch.

16 Claims, 17 Drawing Sheets

GATE DRIVER IN BUCK CONVERTERS

This is a continuation of application Ser. No. 12/163,100 filed Jun. 27, 2008 now U.S. Pat. 7,839,131.

CROSS-REFERENCE TO RELATED APPLICATION

This application is based on and claims priority to U.S. Provisional Patent Application Ser. No. 60/946,550, filed on Jun. 27, 2007 and entitled GATE DRIVING SCHEME FOR DEPLETION MODE DEVICES IN BUCK CONVERTERS, the entire contents of which is hereby incorporated by reference.

BACKGROUND OF THE INVENTION

The present invention relates to gate drivers for depletion mode devices, e.g., in buck converters and more particularly to generating gate drive signals for providing negative voltage offset for turning off depletion mode devices.

When gate to source voltage of a depletion mode device, such as a GaN device, is zero, the device is in ON state. To turn OFF the depletion mode device, a negative voltage needs to be applied on its gate, referenced to source. Gate drivers used for enhancement mode power MOSFETs can not work with the depletion mode devices directly. Therefore, new schemes have to be developed to drive depletion mode devices.

What is needed are new driving schemes for use with gate drivers for depletion mode devices, and in particular, in DC/DC Buck converter circuits.

SUMMARY OF THE INVENTION

It is an object of the present invention to provide a circuit that allows a gate driver to provide negative voltage to the gates of normal ON depletion mode devices.

Provided is a circuit for driving a switching stage including control and sync switches series connected at a switching node, at least one of the control and sync switches being a normal ON depletion mode device, the circuit comprising a gate driver including first and second switching stages for generating gate drive signals for the sync and control switches, respectively, the first switching stage having a first driver output node and the second switching stage having a second driver output node, a signal from the first node driving the sync switch and a signal from the second node driving the control switch; and a circuit connected to the first and second switching stages, the circuit comprising a first circuit providing a first voltage source, the first circuit being coupled to the first switching stage and to the sync switch, a first bias voltage from said first voltage source being switched by said first switching stage, said first switching stage having a first state wherein said sync switch is on, and a second state wherein said first bias voltage is switched to the gate of said sync switch to turn said sync switch off; and a second circuit including a first energy storage device for charging with a second bias voltage, the second switching circuit having a first state, wherein said control switch is on when said sync switch is off and having a second state wherein said control switch is switched off when said sync switch is on by switching said second bias voltage to the gate of said control switch.

Other features and advantages of the present invention will become apparent from the following description of the invention that refers to the accompanying drawings.

BRIEF DESCRIPTION OF THE DRAWINGS

FIG. 1b is a graph illustrating signals for driving the control and sync devices of the sync buck converter circuit of FIG. 1a;

FIG. 2b is a graph illustrating signals for driving the control and sync devices of the sync buck converter circuit of FIG. 2a;

DETAILED DESCRIPTION OF EMBODIMENTS OF THE INVENTION

Figure 1A:
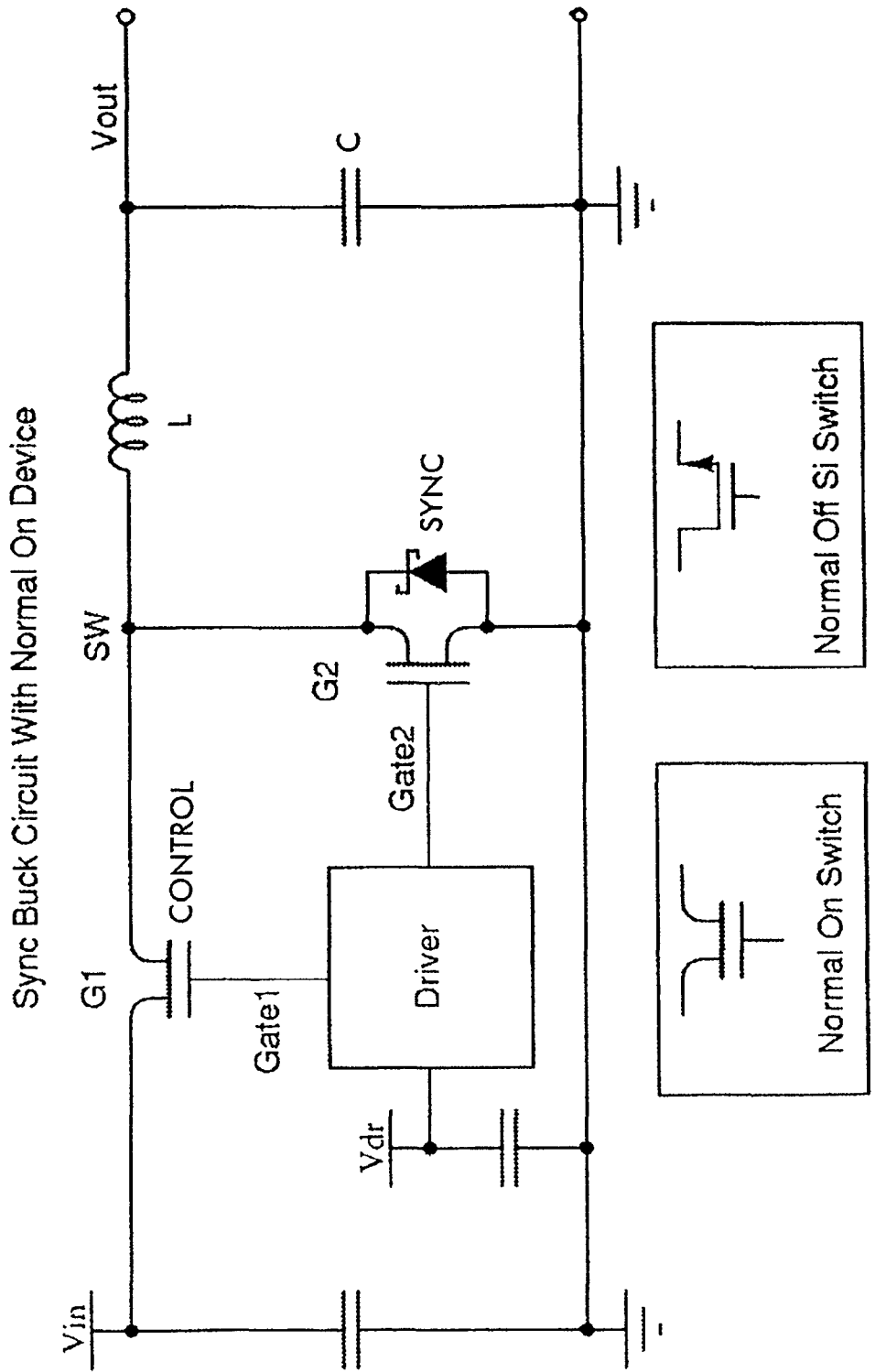
FIG. 1a is a diagram of a synchronous (sync) buck converter circuit with normal ON control and sync devices.
Figure 1B:
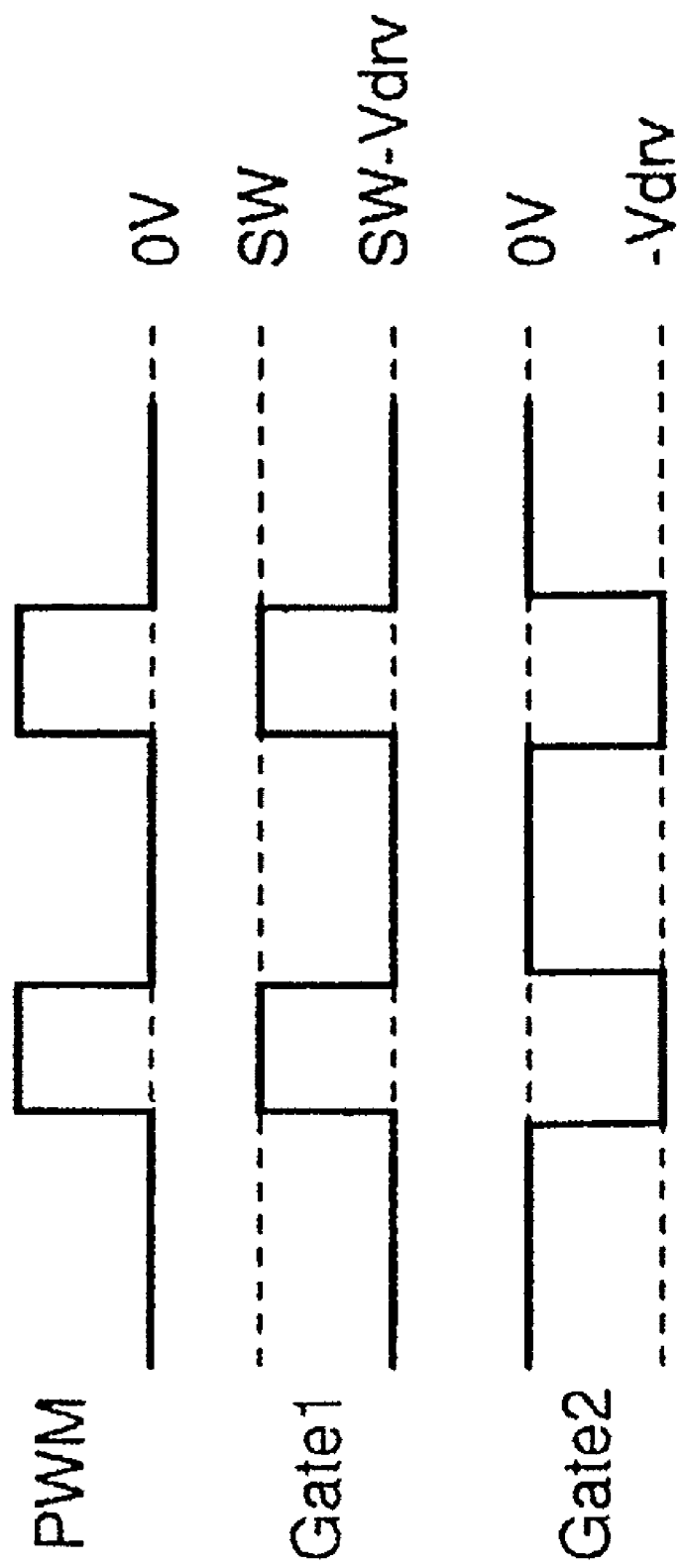
Figure 2A:
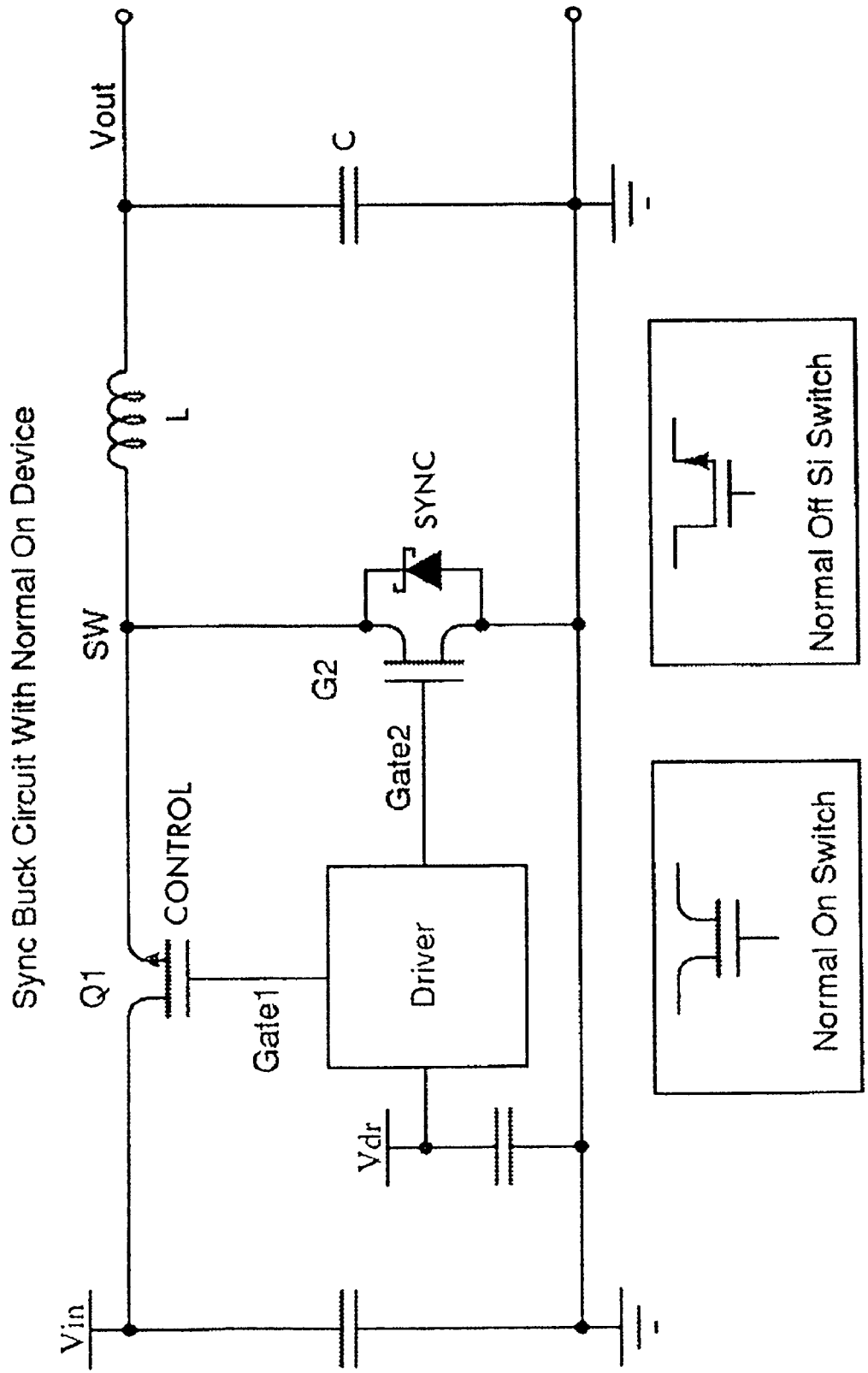
FIG. 2a is a diagram of a sync buck converter circuit with normal OFF control and normal ON sync devices.
Figure 2B:
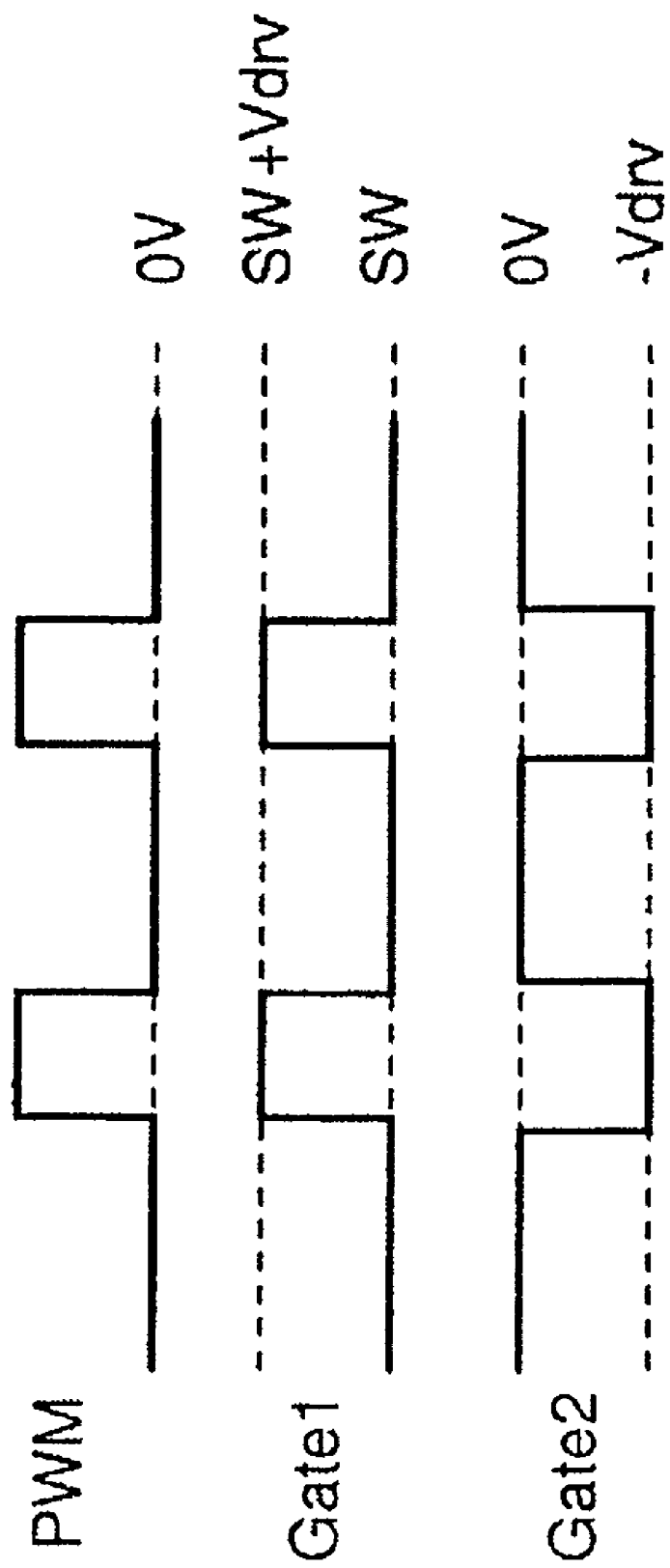

FIGS. 1a and 2a show two configurations of a synchronous Buck converter having a normal ON sync switch device G2. The converter of FIG. 1a uses normal ON devices for both control switch G1 and sync switch device G2. The converter of FIG. 2a uses the normal ON device only for sync switch G2, while using a normal OFF switch for control switch Q1. Accordingly, FIG. 1b shows the gate waveforms required for driving control switch G1 and sync switch G2 of the converter circuit of FIG. 1a and FIG. 2b shows the gate waveforms required for driving control switch Q1 and sync switch G2 of the converter circuit of FIG. 2a.

FIGS. 3a-3f show configurations to drive the sync buck converter with both control and sync switch being normal ON devices. FIGS. 3a-3f illustrate a converter stage having control and sync switches G1 and G2 series connected at a switching node SW. The sync switch has a Zener diode connected across it. Control switch G1 is further connected to a voltage source Vin and sync switch G2 is connected to ground. An LC filter including an inductor L and a capacitor C and the load R are connected to the switching node. For FIGS. 3a-3f both control and sync switches G1 and G2 are normal ON GaN HEMT (high electron mobility transistor) devices.

Figure 3A:
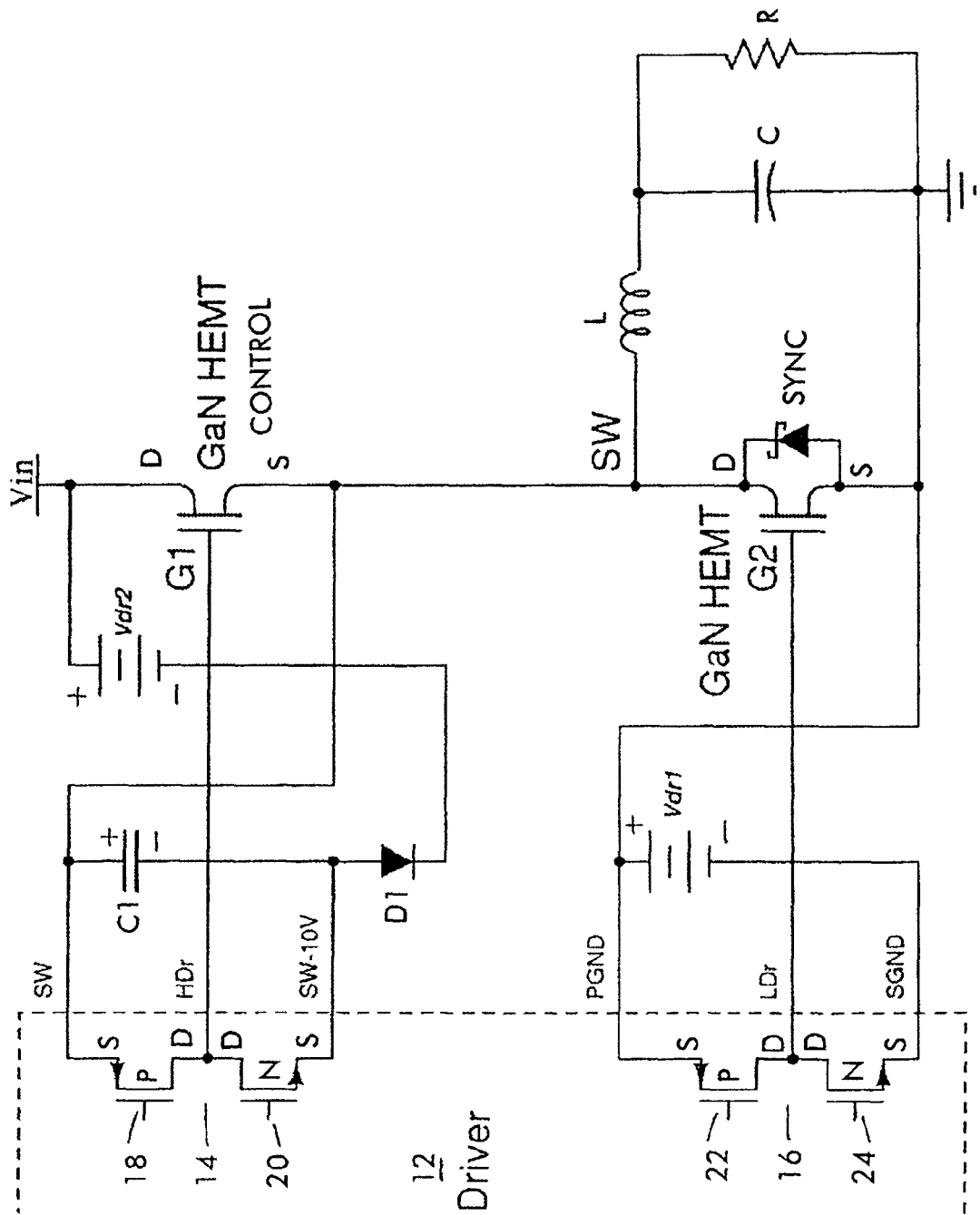
FIGS. 3a-3f are diagrams of various circuits driving sync buck converters with both control and sync switches being normal ON devices.

Turning to FIG. 3a, a driver 12 controlling control and sync switches G1 and G2 includes high and low switching stages 14 and 16. Each switching stage includes a first P-channel switch 18, 22 and a second N-channel switch 20, 24. Although complementary switches are shown, all switches can be of the same type, with appropriate control signals to ensure that the switches of each driver stage are switched on alternately, as known to those of skill in the art. The pairs of switches 18 and 20 and 22 and 24 are connected at switching nodes HDr for the high stage 14 and LDr for the low stage 16. Switching node HDr of the high stage of the driver is connected to a gate terminal of control switch G1 and switching node LDr of the low stage of the driver is connected to a gate terminal of sync switch G2.

In a first embodiment of the Buck circuit of the present invention shown in FIG. 3a, the circuit includes first and second voltage sources Vdr1 and Vdr2, capacitor C1 and diode D1. The source terminal of the switch 18 of the high stage 14 is connected to switching node SW. Capacitor C1 is connected between the source terminals of the switches 18 and 20 of the high stage 14. The positive terminal of second voltage source Vdr2 is connected to the drain of control switch G1. Diode D1 is connected between the source terminal of the switch 20 of the high stage 14 (at anode) and a negative terminal of second voltage source Vdr2 (at cathode).

The source terminal of the switch 22 of the low stage 16 is connected to the source of sync switch G2. The positive terminal of a first voltage source Vdr1 is connected to the source terminal of the switch 22 of the low stage 16 and the negative terminal of first voltage source Vdr1 is connected to the source terminal of the switch 24 of the low stage 16.

The circuit of FIG. 3a operates as follows:

When switch 18 is turned on and switch 20 is off (dead times are being ignored herein for simplicity), the gate of G1 is connected to its source, and the control switch G1 is on.

At the same time, on the sync channel side, switch 22 is off and switch 24 is on. This places—Vdr1 across the gate of G2 to source, so the sync switch is off. When switch 18 is turned off, switch 20 goes on. Before switch 18 goes off, however, capacitor C1 is charged up in the direction shown in FIG. 3a to Vdr2 above $V_{IN}$ via diode D1 through the control switch G1. When switch 20 goes on (and 18 off), the voltage across C1 is coupled across the gate-source path of the control switch such that the gate of G1 is negative with respect to its source. Accordingly, the control switch goes off. Finally, at the same time, on the sync side, switch 22 goes on and switch 24 goes off. This couples the source of the sync switch to its gate and thus the sync switch goes on.

Figure 3B:
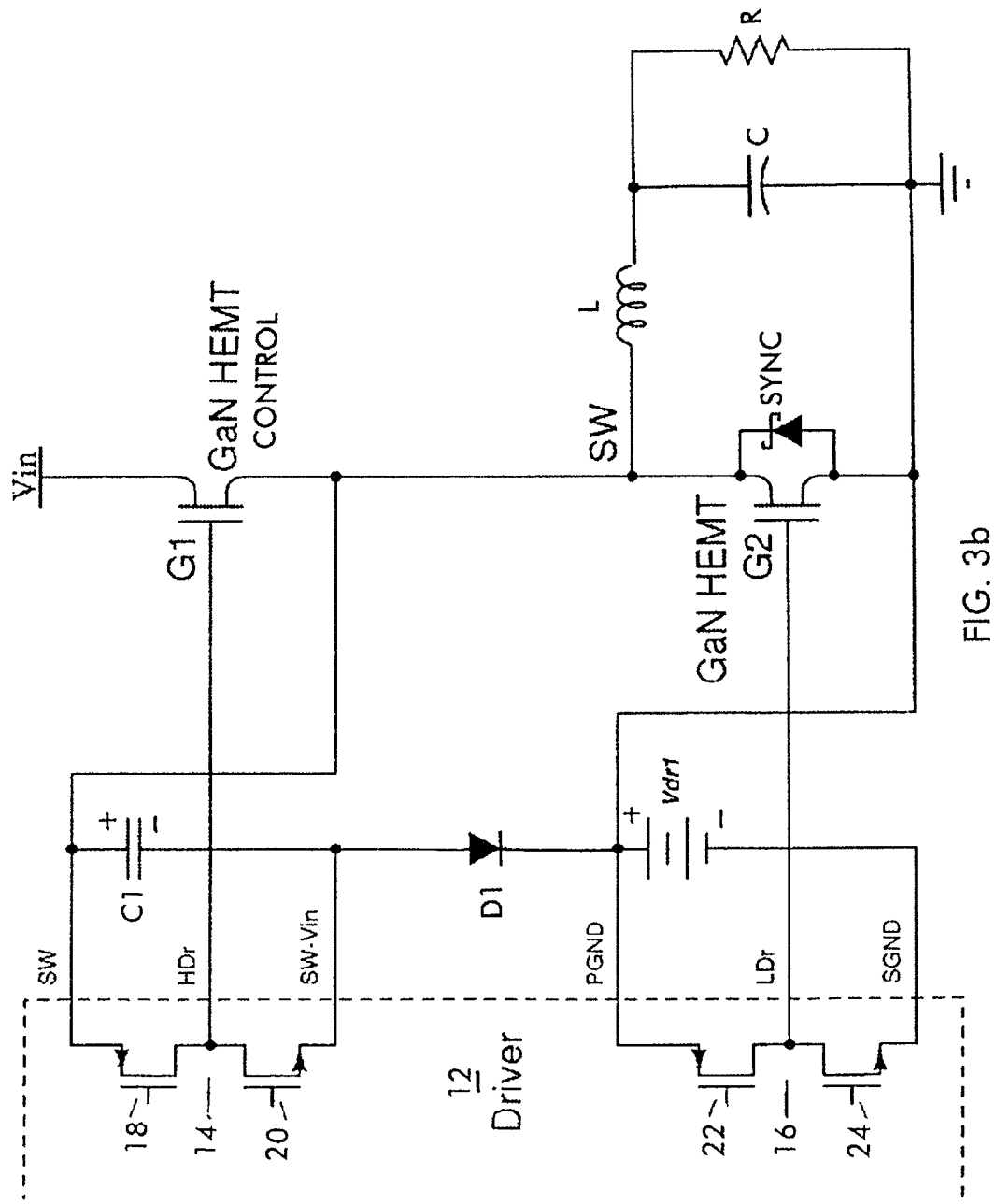

Turning now to FIG. 3b, in this embodiment of the Buck circuit of the present invention, the circuit includes the voltage source Vdr1, capacitor C1, and diode D1. The cathode of diode D1 is connected to a positive terminal of the first voltage source Vdr1.

The circuitry of FIG. 3b works similarly to that of FIG. 3a. When switch 18 is on, the gate of G1 is coupled to the source of the control switch, and it is on. At the same time, capacitor C1 charges up to $V_{IN}$ via D1 and the on control switch to ground.

Switch 20 is off at this time.

Switch 22 is off and switch 24 is on, so the gate of G2 has—Vdr1 applied to it with respect to its source, so it is off.

When switch 20 goes on (18 goes off), the gate of G1 goes to—$V_{IN}$ (charged across C1) with respect to its source and it goes off. At the same time, switch 22 is on and switch 24 is off. The gate of G2 is connected to its source and thus it is on.

Thus, the circuits operate by using the driver circuits to switch voltage sources or stored energy across the gate-source paths of the control and sync switches to turn them on and off.

Figure 3C:
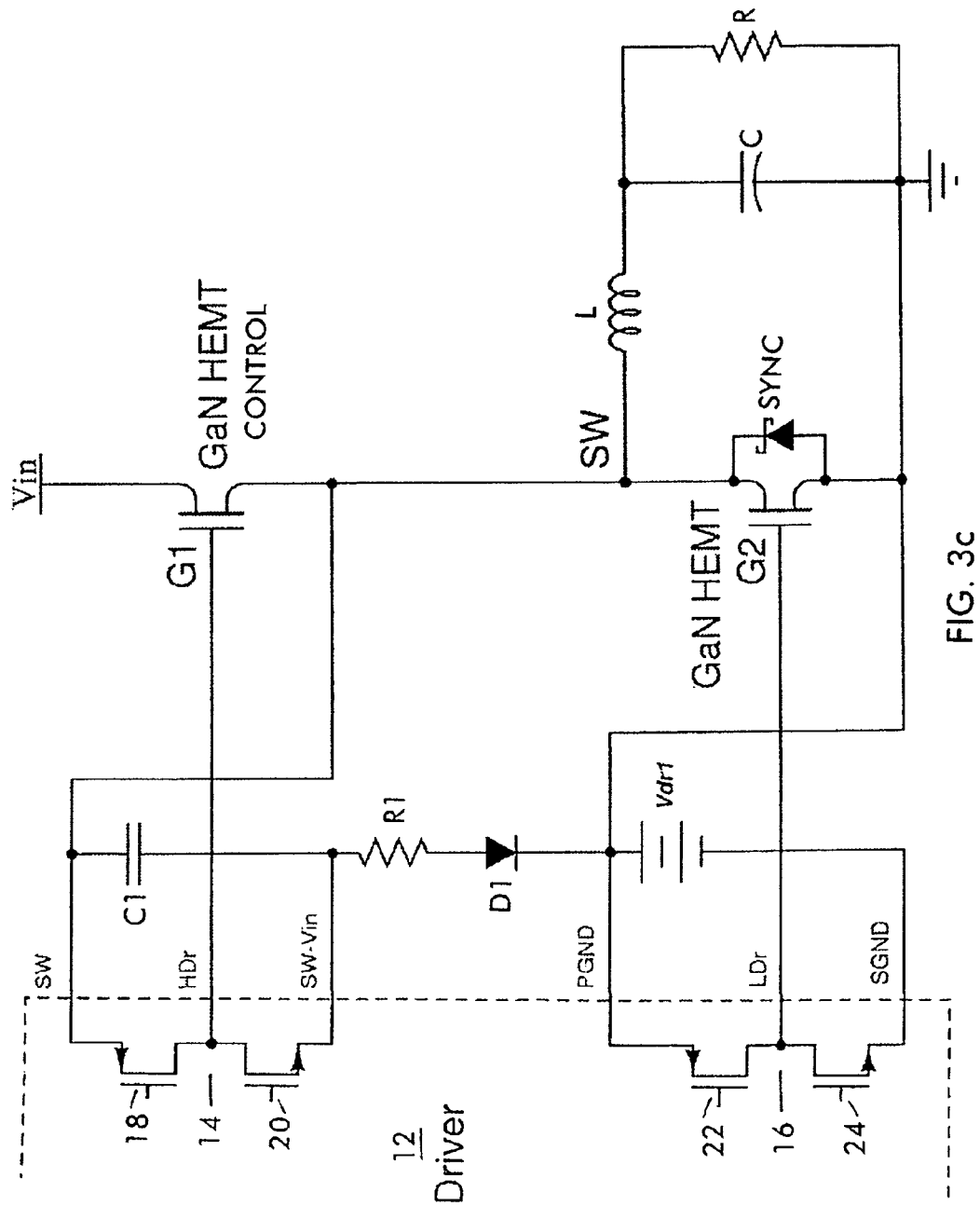

The Buck circuit of the embodiment of FIG. 3c is similar to that of FIG. 3b. It includes resistor R1 positioned between the capacitor C1 and the anode of diode D1 to limit charging of C1 from $V_{IN}$.

Figure 3D:
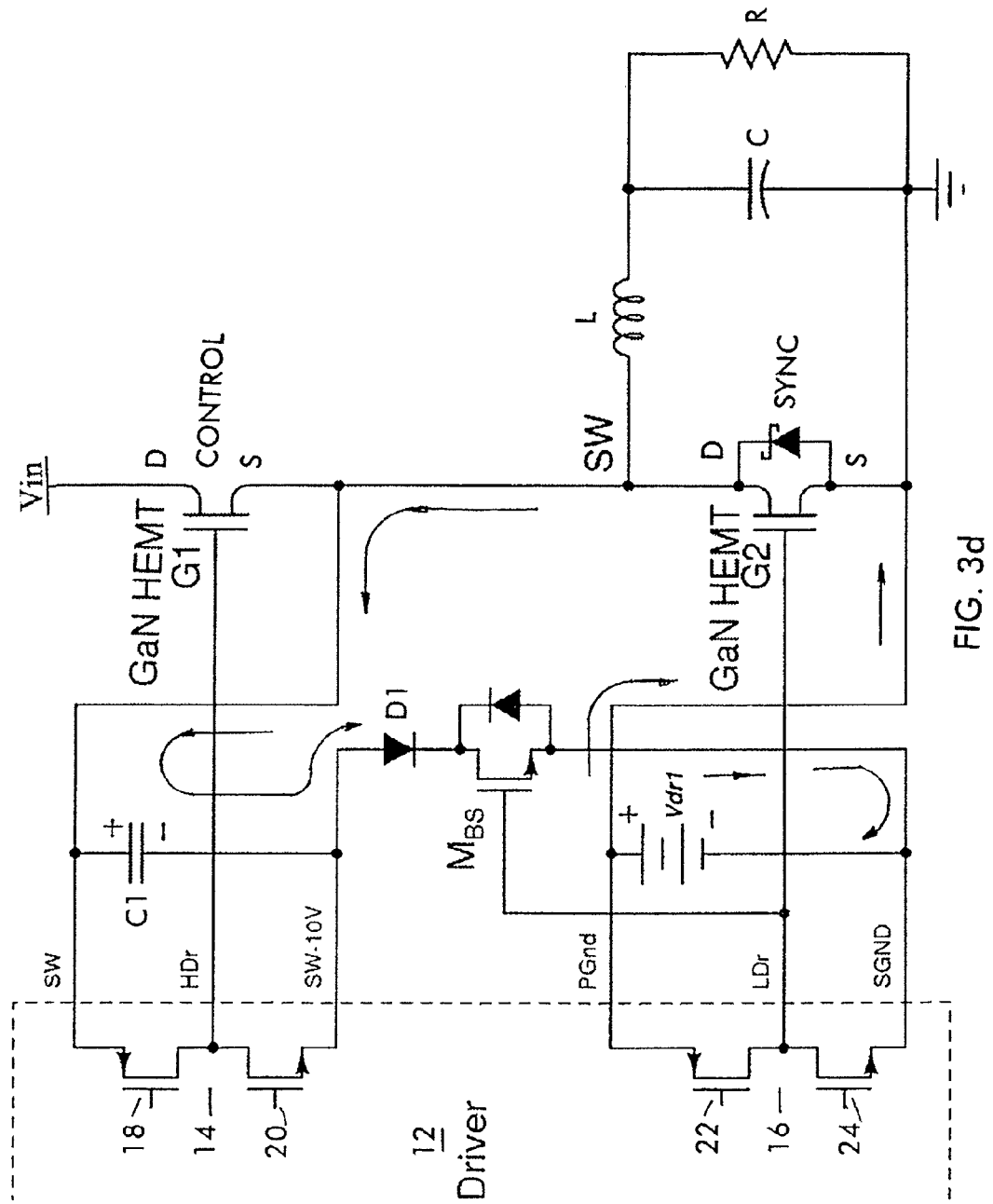
Figure 3E:
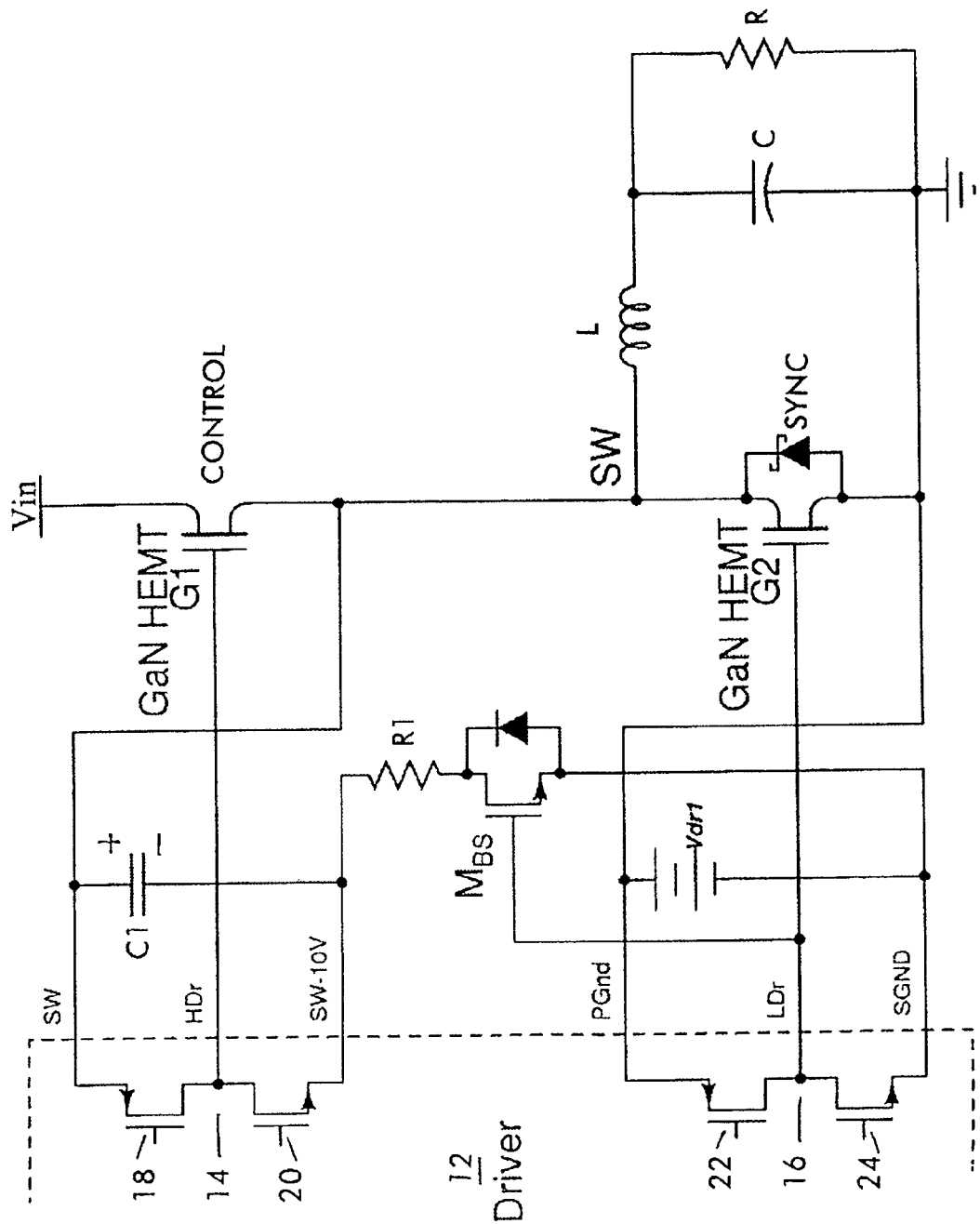

The Buck circuit embodiment of FIG. 3d also includes only one voltage source Vdr1, capacitor C1, diode D1, and a N-channel switch $M_{BS}$. The source terminal of the switch 18 of the high stage 14 is connected to switching node SW. Capacitor C1 is connected between the source terminals of the switches 18 and 20 of the high stage 14. The source terminal of the switch 22 of the low stage 16 is connected to the source of sync switch G2. The positive terminal of voltage source Vdr1 is connected to the source terminal of the switch 22 of the low stage 16 and the negative terminal of the first voltage source Vdr1 is connected to the source terminal of the switch 24 of the low stage 16. The anode of diode D1 is connected to the source terminal of the switch 20 of the high stage 14 and its cathode is connected to the drain of switch $M_{BS}$. The gate of switch $M_{BS}$ is controlled by a node LDr and MBS is turned on when switch 22 is on (and the sync switch 62 is on). The source of MBS is connected to the source terminal of the switch 24 of the low stage 16. FIG. 3e modifies the above circuit by replacing diode D1 with a resistor R1. Switch $M_{BS}$ functions like a bootstrap circuit, charging up from Vdr1 when switch 22 is on and the sync switch is on. In FIG. 3e, capacitor C1 charges through R1 instead of diode D1.

Figure 3F:
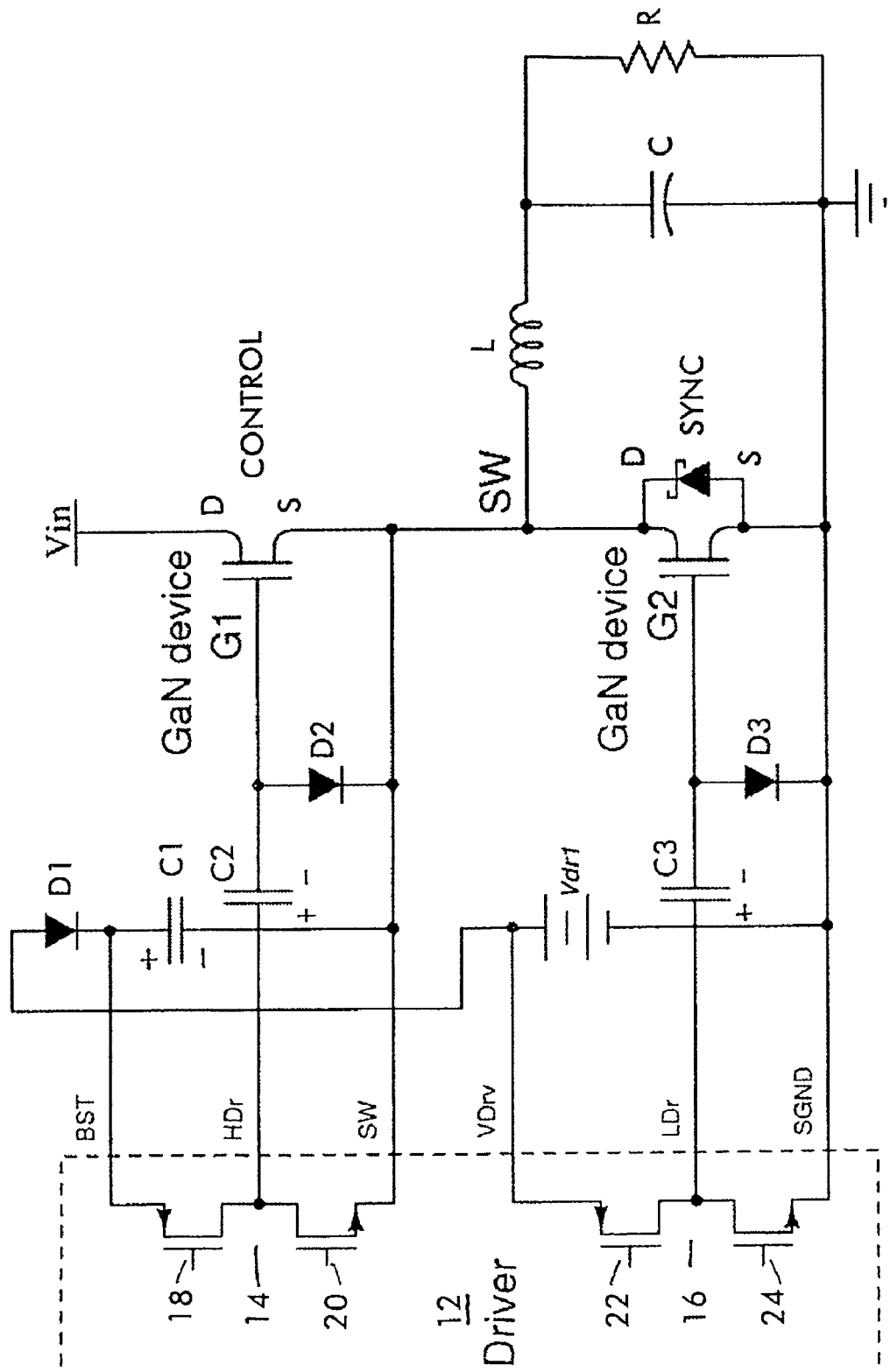

The Buck circuit embodiment of FIG. 3f includes only one voltage source Vdr1, three capacitors C1, C2, and C3, and three diodes D1, D2, and D3. The capacitor C1 is connected between the source terminals of the switches 18 and 20 of the high stage 14. The positive terminal of voltage source Vdr1 is connected to the source terminal of the switch 22 of the low stage 16 and the negative terminal of the first voltage source Vdr1 is connected to the source terminal of the switch 24 of the low stage 16. The anode of diode D1 is connected to the positive terminal of voltage source Vdr1 and its cathode is connected to the source terminals of the switch 18 of the high stage 14. Capacitor C2 is connected between node HDr of the high stage 14 and the gate terminal of control switch G1 and the anode of diode D2 is connected between the gate terminal of control switch G1 and the source terminal of the switch 20 of the high stage 14, which is also connected to switching node SW. The capacitor C3 is connected between node LDr of the low stage 16 and the gate terminal of sync switch G2 and the anode of diode D3 is connected between the gate terminal of sync switch G2 and the source terminal of the switch 24 of the low stage 16, which is also connected to the drain of the sync switch.

Capacitor C1 charges up from Vdr1 through D1 when the sync switch G2 is on, like a bootstrap capacitor circuit. The normal ON control switch is on when switch 18 is turned on.

The synchronous switch G2 is turned off when switch 24 goes on. Capacitor C3 charges to Vdr1 through diode D3 when switch 22 is on. When switch 24 goes on, the gate of G2 is made negative with respect to the source and the sync switch turns off.

To turn the control switch Off, switch 20 is turned on and is off. Capacitor C2 is charged up when switch 18 is on by the charge on capacitor C1. When switch 20 goes on, the charge on capacitor C2 is placed across the gate-source path of G1, such that the gate of G1 is negative with respect to the source, turning the control switch off.

The normal ON sync switch G2 is on when switch 22 turns on.

FIGS. 4a-4d show configurations for use with converters wherein only the sync switch is a normal ON switch and the control switch G1 is a normal OFF enhancement node device.

Figure 4A:
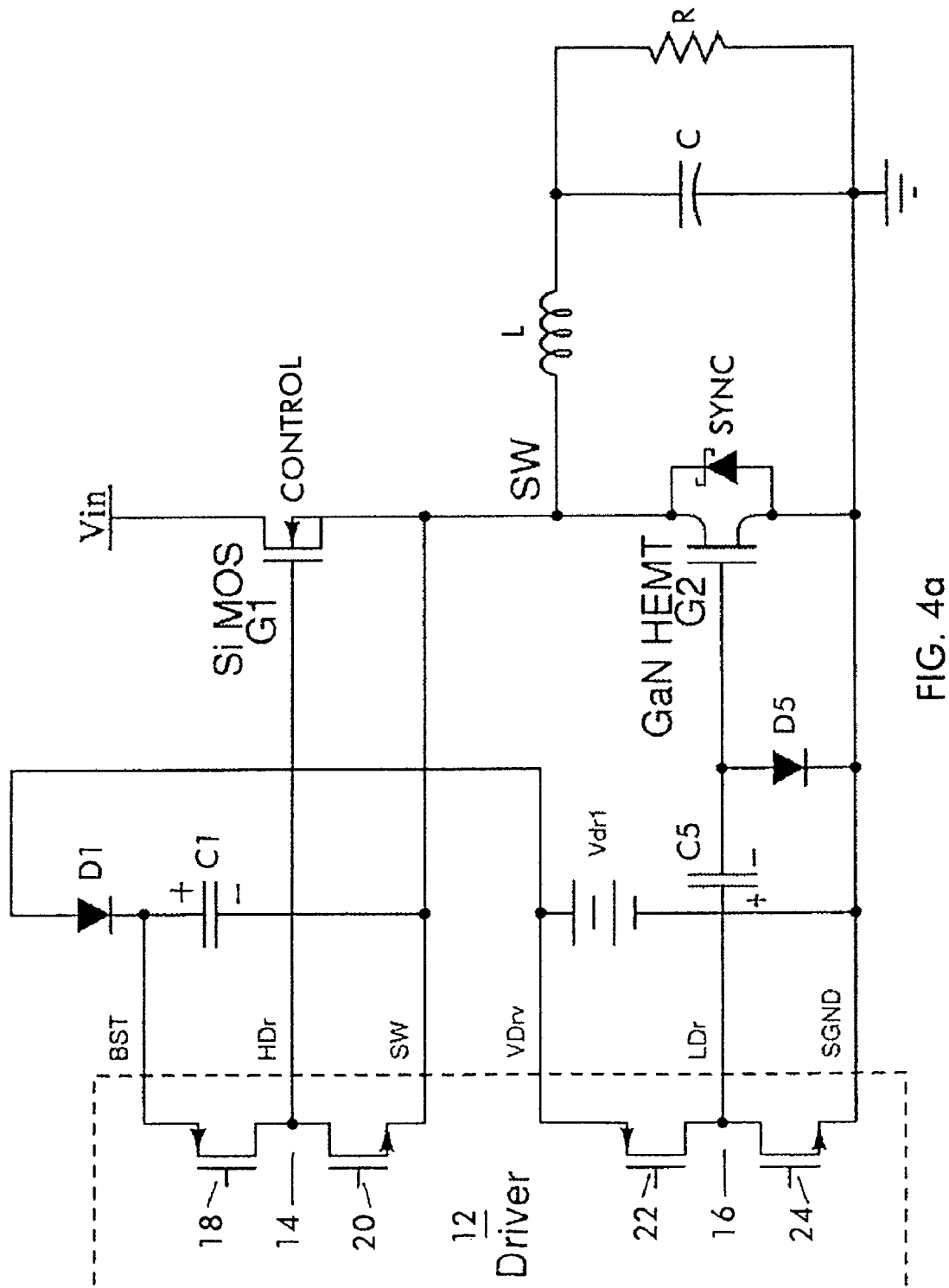
FIGS. 4a-4d are diagrams of various circuits driving sync buck converters with only the sync switch being a normal ON switch.

The Buck circuit embodiment of FIG. 4a includes one voltage source Vdr1, two capacitors C1 and C5, and two diodes D1 and D5. Capacitor C1 is connected between the source terminals of the switches 18 and 20 of the high stage 14. The positive terminal of voltage source Vdr1 is connected to the source terminal of the switch 22 of the low stage 16 and the negative terminal of the first voltage source Vdr1 is connected to the source terminal of the switch 24 of the low stage 16. The anode of diode D1 is connected to the positive terminal of voltage source Vdr1 and its cathode is connected to the source terminal of the switch 18 of the high stage 14. Capacitor C5 is connected between node LDr of the low stage 16 and the gate terminal of sync switch G2 and the anode of diode D5 is connected between the gate terminal of sync switch G2 and the source terminal of the switch 24 of the low stage 16, which is also connected to the drain of the sync switch.

The circuit of FIG. 4a operates as follows:

When switch 22 is on, capacitor C5 charges through switch 22 and D5 from Vdr1. The normal ON sync switch G2 is on.

Switch 20 is also on and the control switch G1 is off, as it is not a depletion device and its gate is connected to its source by switch 20. Capacitor C1 charges up to Vdr1 through diode D1 and the on sync switch G2. To turn the control switch on, switch 18 goes on and the charge on C1 is provided to the gate of G1, turning the enhancement mode control switch on. At the same time, the sync switch is turned off when switch 24 is turned on. The charge stored on C5 when switch 22 was on from source Vdr1 is provided across the gate-source path of the sync switch G2 such that the gate is negative with respect to the source, turning the sync switch off.

Figure 4B:
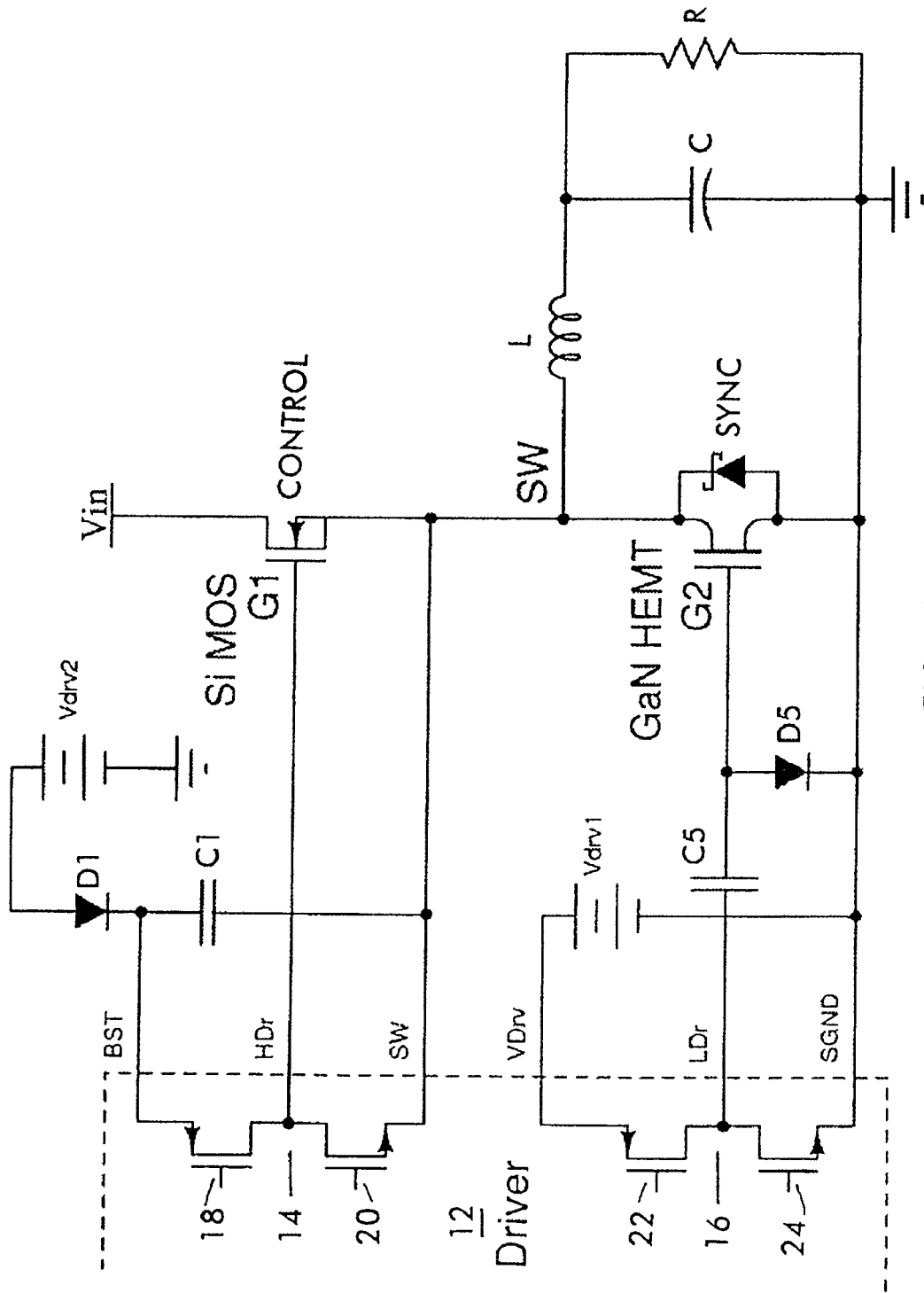
Figure 4C:
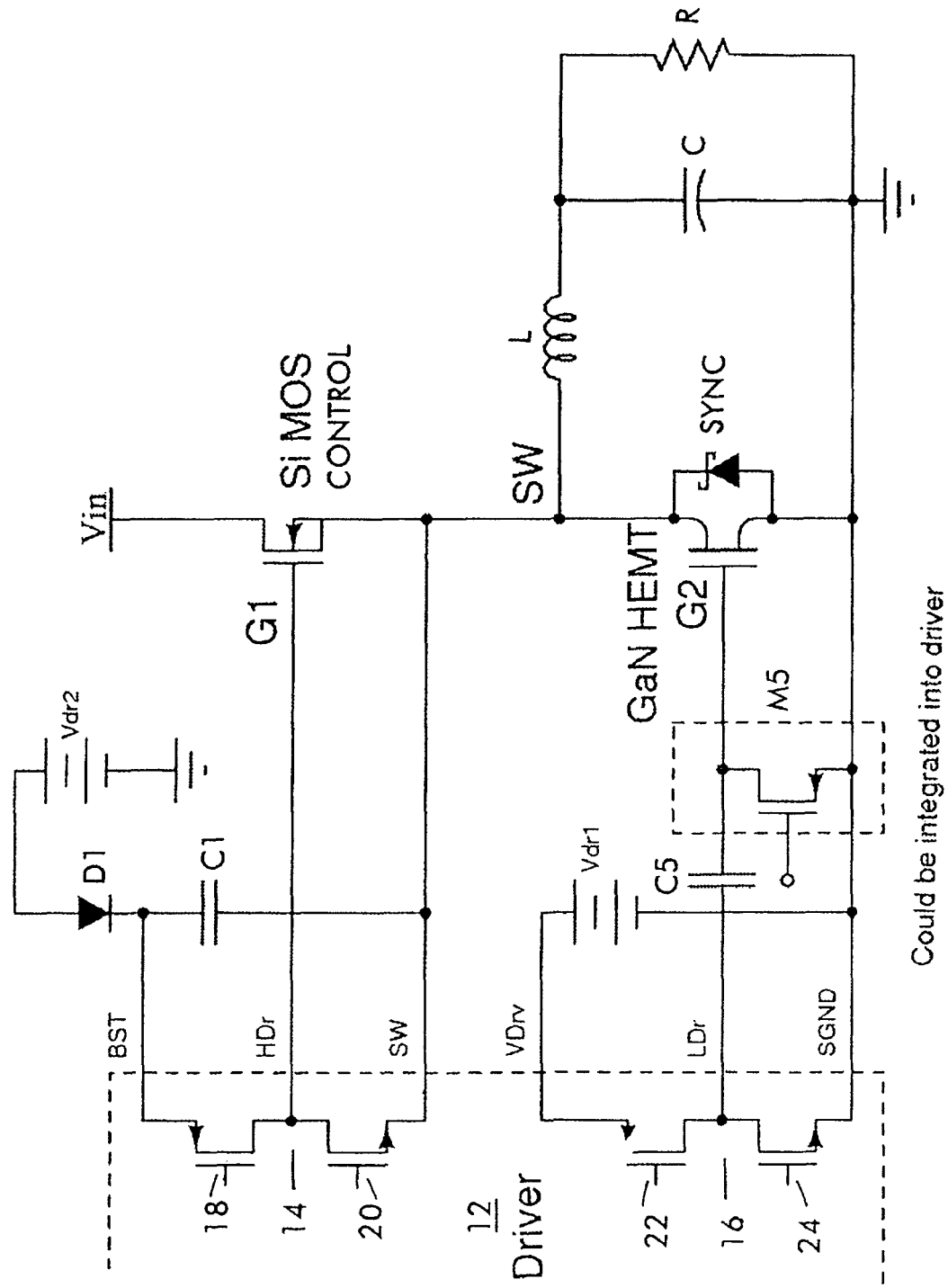
Figure 4D:
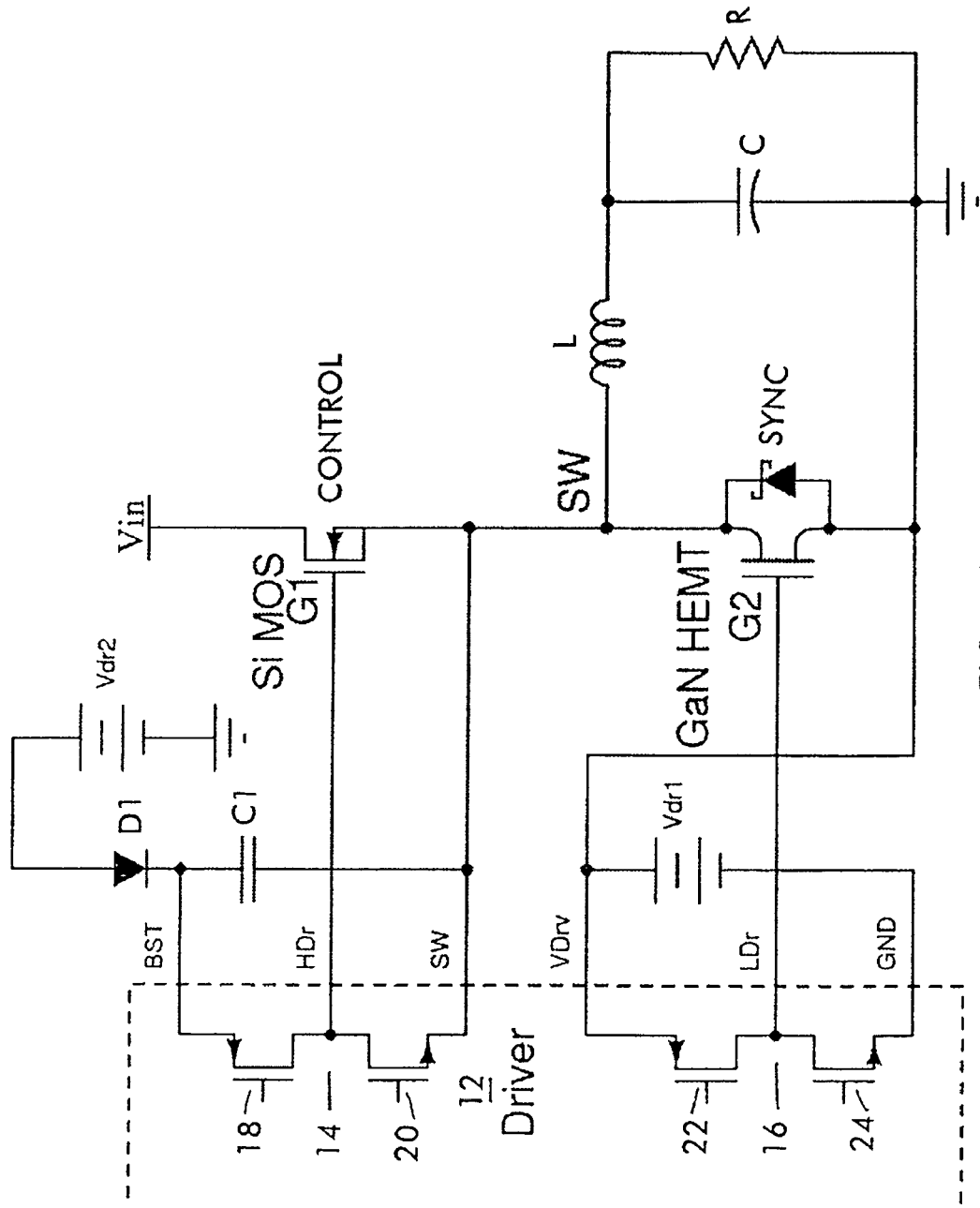

The Buck circuit embodiments of FIGS. 4b-4d include a second voltage source Vdr2. In FIG. 4b, instead of connecting to voltage source Vdr1, the anode of diode D1 is connected to the positive terminal of the second voltage source Vdr2 and C1 charges from Vdr2 when the sync switch G2 is on. The embodiment of FIG. 4c modifies that of FIG. 4b by replacing diode D5 with a P-channel controlled switch M5. Diode D5 and switch M5 may be integrated into tie driver 12. Switch M5 is turned on when switch 22 is on.

FIG. 4d illustrates an embodiment (like FIG. 3a) having the drain terminal of the switch 22 of the low stage 16 connected to the gate terminal of sync switch G2 and voltage source Vdr1 connected between the source terminals of the switches 22 and 24 of the low stage 16. Capacitor C1 is connected between the source terminals of the switches 18 and 20 of the high stage 14. Diode D1 connects to the positive terminal of voltage source Vdr2 and to the source terminal of the switch 18 of the high stage 14. The low driver operates similarly to the low driver of FIG. 3a.

The above-described circuits drive depletion mode devices from 0V to −Vcc, which is for example −7V. Slight modification of the above circuits can enable the driver from Vcc1 to Vcc2, e.g., −3V to −10V or −4V to 3V for normally ON devices as the control or sync FET.

Figure 5A:
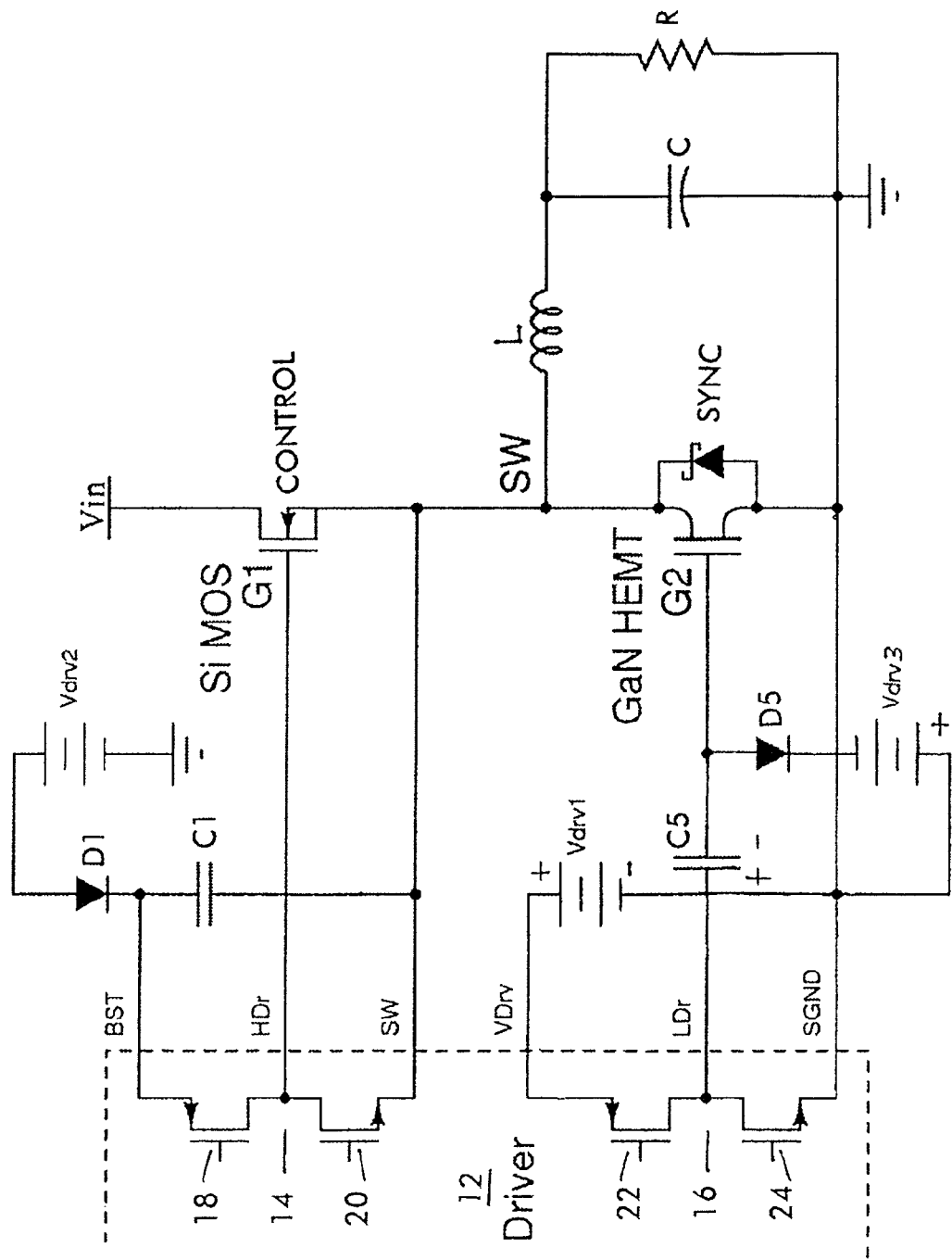
FIGS. 5a-5b are diagrams of circuits driving sync buck converters with only the sync switches being normal ON devices.
Figure 5B:
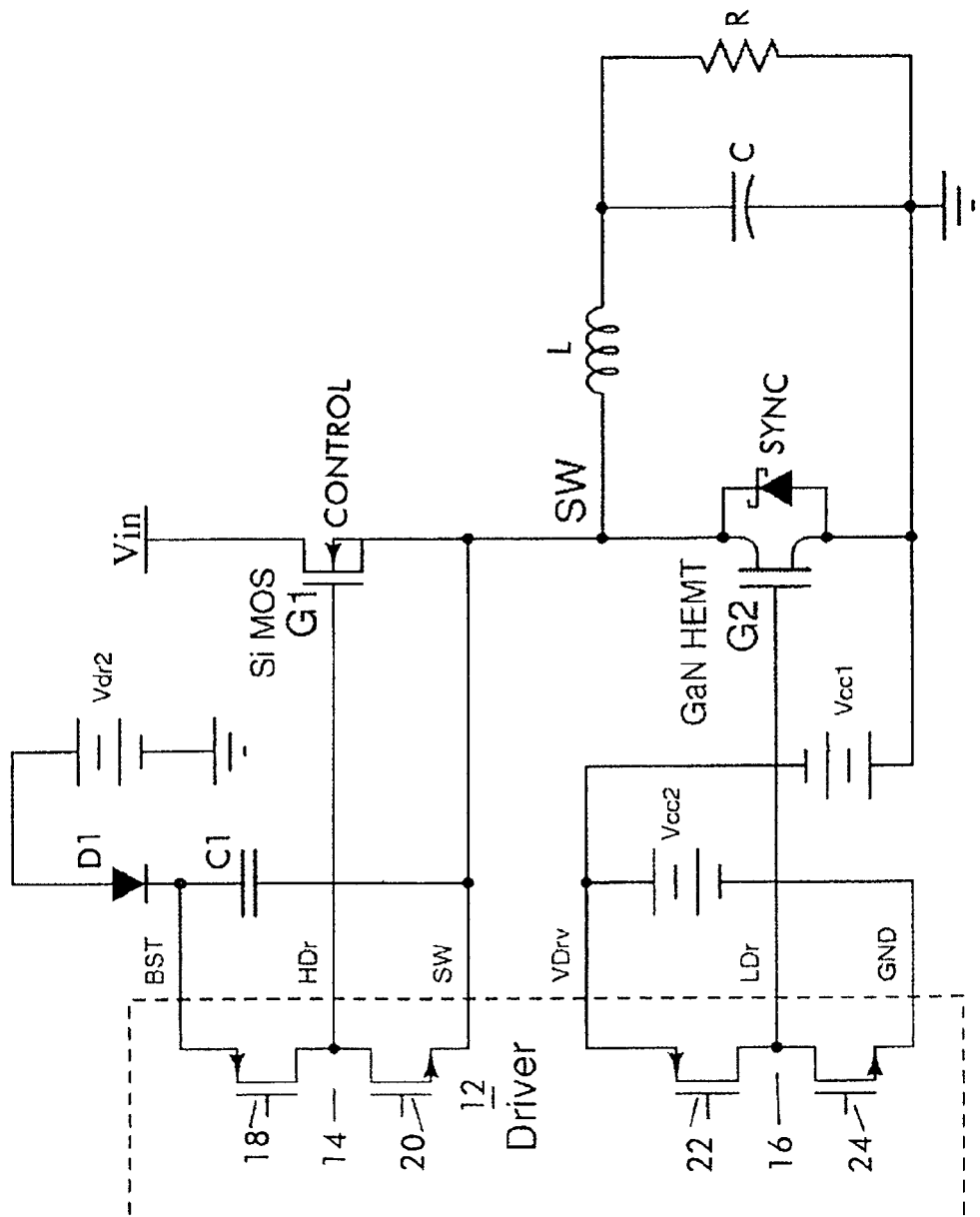

FIGS. 5a-5b show such modified configurations for use with sync buck converters where the control switch is an enhancement mode silicon FET and the sync switch is a normal ON device and having three voltage sources.

FIG. 5a illustrates a configuration similar to that of FIG. 4b but adds a third voltage source. Correspondingly, FIG. 5b illustrates a configuration similar to that of FIG. 4d but adds the third voltage source between the source terminal of the switch 22 of the low stage 16 and the gate terminal of sync switch G2.

In the circuit of FIG. 5a, the depletion mode sync switch is turned off by the combined voltage Vdrv1+Vdrv3 charged across C5 via switch 22 when switch 24 is turned on.

In the circuit of FIG. 5b, the sync switch is on when switch 22 turns on. This places −Vcc1 across the gate-source path. This transistor is on with −Vcc1 at its gate. To turn the switch G2 off, an even more negative voltage −(Vcc1+Vcc2) is provided across the gate-source path of G2 by switch 24.

Figure 6:
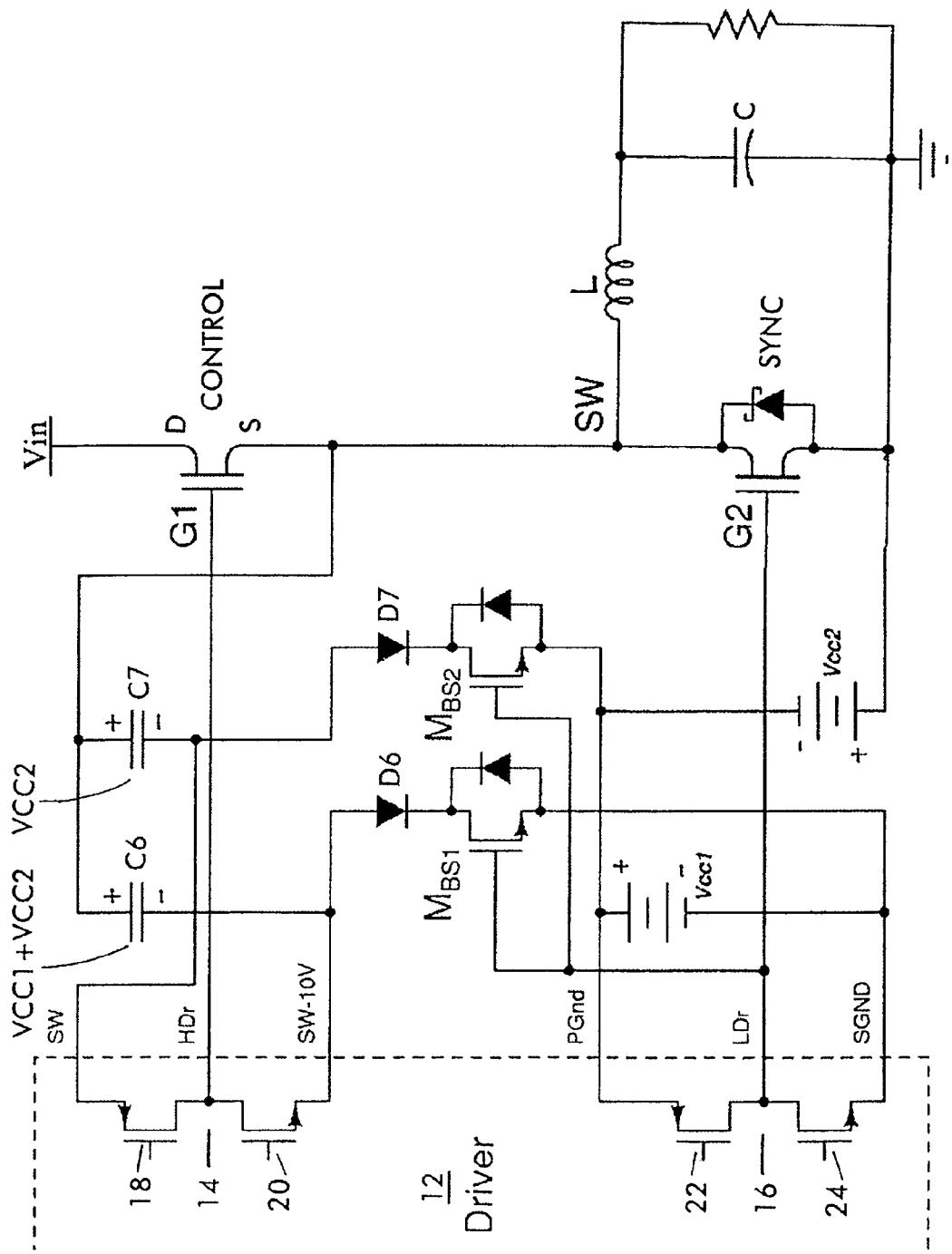
FIG. 6 is a diagram of a circuit driving a sync buck converter with both the control and sync switches being normal ON switches.

FIG. 6 shows another modified configuration for use with sync buck converters with both switches being the normal ON type and employing two bias voltages. In this circuit, the switches G1 and G2 remain on at a first negative gate-source voltage and turn off at an even more negative gate-source voltage. The Buck circuit embodiment of FIG. 6 includes the two voltage sources Vcc1 and Vcc2, two capacitors C6 and C7, two diodes D6 and D7, and two N-channel switches Mbs1 and Mbs2. Voltage source Vcc1 is connected between the source terminals of the switches 22 and 24 of the low stage 16 and voltage source Vcc2 is connected between the source terminal of the switch 22 of the low stage 16 and the source of sync switch G2. Capacitor C6 is connected between the source terminal of the switch 20 of the high stage 14 and switching node SW. Capacitor C7 is connected between the source terminal of the switch 18 of the high stage 14 and the switching node SW. A first terminal of the switch Mbs1 is connected to the source terminal of the switch 20 of the high stage 14 via the diode D6 and its second terminal is connected to the source terminal of the switch 24 of the low stage 16. A first terminal of switch Mbs2 is connected to the source terminal of the switch 18 of the high stage 14 via diode D7 and its second terminal is connected to the source terminal of the switch 22 of the low stage 16. Gate terminals of switches Mbs1 and Mbs2 are connected to node LDr of the low stage 16 and driven on when switch 22 is driven on.

In the circuit of FIG. 6, capacitors C6 and C7 are charged when switch 22 is turned on and the sync switch is thus on. Capacitor C6 charges to Vcc1+Vcc2 through D6, MBS1 and the sync switch. Capacitor C7 charges to Vcc2 through D7, MBS2 and the sync switch. When switch 22 is on, the gate of G2 is at −Vcc2 so G2 is on. This allows the capacitors C6 and C7 to charge as discussed.

When switch 22 is on, switch 20 is also on. This connects the gate of G1 to the voltage of C6 (−(Vcc1+Vcc2)) such that the gate of G1 is more negative with respect to the source. G1 is thus off.

When switches 24 and 18 go on, the gate of G2 is driven to −(Vcc1+Vcc2) by switch 24, so G2 turns off. At the same time, when switch 18 goes on, −Vcc2 is provided across the gate-source path of G1 by C7 so it is driven on.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A driver circuit for driving control and sync switches, said driver circuit comprising:
a gate driver including first and second switching stages for generating gate drive signals for said sync and control switches, respectively;
a first circuit providing a first voltage source and coupled to said first switching stage and to said sync switch, a first bias voltage from said first voltage source being switched by said first switching stage, said first switching stage having a first state wherein said sync switch is on, and a second state wherein said first bias voltage is switched to a gate of said sync switch to turn said sync switch off;
wherein at least one of said control and sync switches is a normal ON device.

2. The driver circuit of claim 1 further comprising:
a second circuit including a first energy storage device for charging with a second bias voltage, said second switching stage having a first state, wherein said control switch is on when said sync switch is off.

3. The driver circuit of claim 1 further comprising:
a second circuit including a first energy storage device for charging with a second bias voltage, said second switching stage having a first state, wherein said control switch is on when said sync switch is off and having a second state wherein said control switch is switched off when said sync switch is on by switching said second bias voltage to said gate of said control switch.

4. The driver circuit of claim 1, wherein said sync switch is a depletion mode device and said first switching stage comprises first and second series connected alternately on switches having a common connection at a first node, said first node being connected to said gate of said sync switch.

5. The driver circuit of claim 4, wherein said first switch controls said sync switch in response to a first control signal and said second switch provides said first bias voltage to said gate of said sync switch in response to a second control signal such that said gate of said sync switch is negative with respect to said source of said sync switch, thereby turning it off.

6. The driver circuit of claim 2, wherein said control switch is a depletion mode device and said first energy storage device comprises a first capacitor charged up from a voltage source, said second switching stage comprising third and fourth series connected alternately switched on switches having a common connection at a second node, said second node being connected to said gate of said control switch.

7. The driver circuit of claim 6, wherein said third switch controls said control switch in response to a third control signal and said fourth switch provides said charged voltage across said first capacitor to said gate of said control switch in response to a fourth control signal such that said gate of said control switch is negative with respect to said source, thereby turning it off.

8. The driver circuit of claim 6, wherein said first capacitor is charged up when said control switch is on.

9. The driver circuit of claim 6, wherein said voltage source comprises a second voltage source and said first capacitor is coupled to said second voltage source by a diode.

10. The circuit of claim 6, wherein said voltage source comprises a bus voltage source supplying a load connected to said switching stage and being coupled across said control and sync switches.

11. The circuit of claim 10, further comprising a diode coupling said first capacitor to a negative side of said bus voltage.

12. The circuit of claim 9, further comprising a resistor in series with said diode for limiting charging current to said first capacitor.

13. The circuit of claim 6, further comprising a further controlled switch coupling said first capacitor to said first voltage source, whereby when said sync switch is on and said further controlled switch is on, said first capacitor is charged from said first voltage source through said sync switch and said further controlled switch.

14. The circuit of claim 13, wherein said further controlled switch is turned on when said first switch is turned on.

15. The circuit of claim 13, further comprising a diode coupling said first capacitor to said further controlled switch.

16. The circuit of claim 13, further comprising a diode coupling said first capacitor to said further controlled switch.

* * * * *